US011656109B2

(12) United States Patent
Scarborough, III et al.

(10) Patent No.: US 11,656,109 B2
(45) Date of Patent: May 23, 2023

(54) INTERCHANGEABLE ULTRASONIC MEASURING ELEMENT WITH REFLECTOR PLATE SITUATED IN AN IN-LINE PIPING SYSTEM OF A WATER METER

(71) Applicant: Neptune Technology Group Inc., Tallassee, AL (US)

(72) Inventors: John R. Scarborough, III, Auburn, AL (US); J. Davis Garth, Tallassee, AL (US); Mahesh K. Matam, Cumming, GA (US); Ross Peter Jones, Cambridge (GB)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 282 days.

(21) Appl. No.: 17/083,381

(22) Filed: Oct. 29, 2020

(65) Prior Publication Data

US 2021/0131845 A1 May 6, 2021

Related U.S. Application Data

(60) Provisional application No. 62/928,537, filed on Oct. 31, 2019.

(51) Int. Cl.
*G01F 1/66* (2022.01)
*G01F 15/18* (2006.01)

(52) U.S. Cl.
CPC ............ *G01F 1/662* (2013.01); *G01F 15/18* (2013.01)

(58) Field of Classification Search
None
See application file for complete search history.

(56) References Cited

U.S. PATENT DOCUMENTS 4,195,517 A   4/1980 Kalinoski et al.
4,308,754 A   1/1982 Pedersen et al.
(Continued)

FOREIGN PATENT DOCUMENTS

CN    104936517 A    9/2015
DE  102008019989 A1  11/2009
(Continued)

OTHER PUBLICATIONS

Von Jena et al., "Ultrasound gas-flow meter for household application," Sensors and Actuators A., 6 pages, 1993.

*Primary Examiner* — Harshad R Patel
(74) *Attorney, Agent, or Firm* — Snyder, Clark, Lesch & Chung, LLP

(57) ABSTRACT

A measuring element for a water meter assembly is provided. The measuring element may be interchangeably installed within a main case that is permanently situated in-line with a monitored piping system. The measuring element includes a measuring channel, an electronics module, and an acoustic reflector plate. The measuring element has a top wall with multiple ports and a bottom wall with a recess. The electronics module is mounted above the top wall. The electronics module includes one or more pairs of ultrasonic transducers configured to transmit ultrasonic signals through the multiple ports into the measuring channel, and a processor to calculate a flow value based on the transmitted ultrasonic signals from the one or more pairs of ultrasonic transducers. The acoustic reflector plate is mounted in the recess and includes at least one concave reflector that reflects the transmitted ultrasonic signals between the one or more pairs of ultrasonic transducers.

20 Claims, 15 Drawing Sheets

(56) References Cited

U.S. PATENT DOCUMENTS

| | | | |
|---|---|---|---|
| 5,329,821 | A | 7/1994 | Birnbaum et al. |
| 7,162,930 | B2 | 1/2007 | Hashimoto |
| 7,360,447 | B2 | 4/2008 | Kroemer et al. |
| 8,794,080 | B2 | 8/2014 | Mueller et al. |
| 8,806,957 | B2 | 8/2014 | Laursen et al. |
| 9,310,236 | B2 | 4/2016 | Baumoel |
| 2005/0139013 | A1* | 6/2005 | Hashimoto ............ G10K 11/02 73/644 |
| 2011/0079090 | A1* | 4/2011 | Kroemer ................. G01F 1/662 73/861.25 |
| 2012/0055264 | A1* | 3/2012 | Sinha ....................... G01F 1/74 73/861.25 |
| 2016/0195418 | A1* | 7/2016 | Drachmann ............ G01F 1/667 73/861.28 |
| 2016/0305805 | A1* | 10/2016 | Baumoel ................. G01F 1/663 |
| 2017/0146378 | A1 | 5/2017 | Drachmann |
| 2018/0149504 | A1* | 5/2018 | Zipperer ................. G01F 1/667 |
| 2019/0226892 | A1 | 7/2019 | Kuhlemann et al. |
| 2019/0226893 | A1* | 7/2019 | Kuhlemann ............ G01F 1/662 |
| 2020/0249060 | A1* | 8/2020 | Helfenstein ............ G01F 1/662 |
| 2022/0203441 | A1* | 6/2022 | Välisalo ................. B22F 5/106 |

FOREIGN PATENT DOCUMENTS

| | | |
|---|---|---|
| EP | 2130004 A1 | 12/2009 |
| EP | 0890826 B8 | 5/2010 |
| EP | 2725327 A1 | 4/2014 |
| JP | H0921665 A | 1/1997 |
| JP | 2000304583 A | 11/2000 |
| JP | 2008122317 A | 5/2008 |
| WO | 1996024029 A1 | 8/1996 |

\* cited by examiner

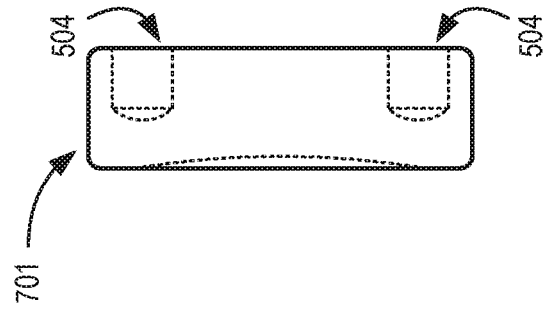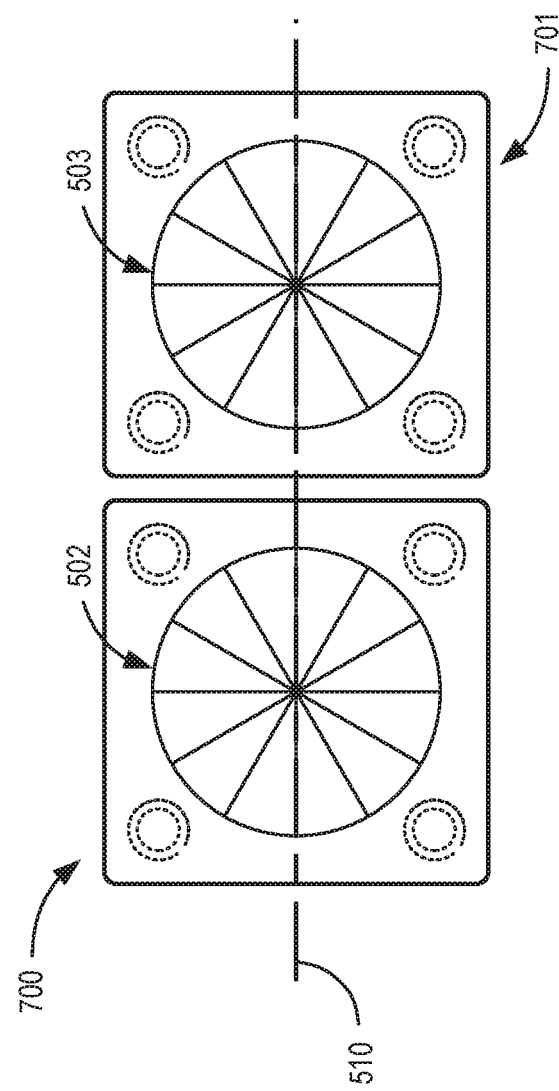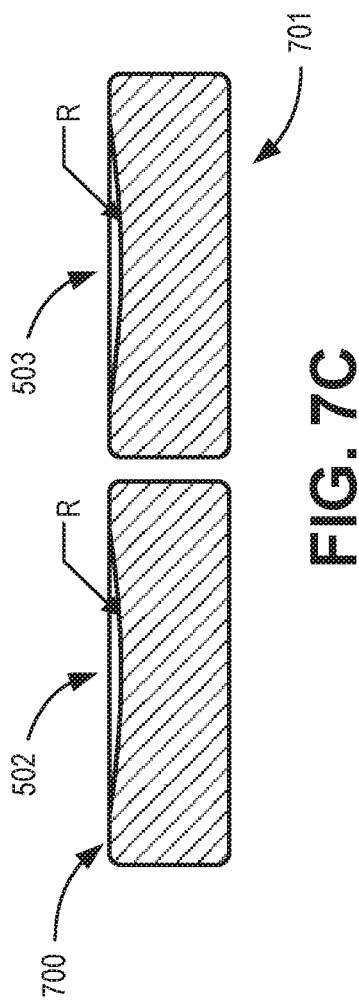

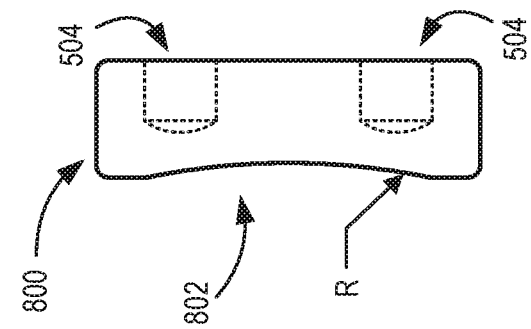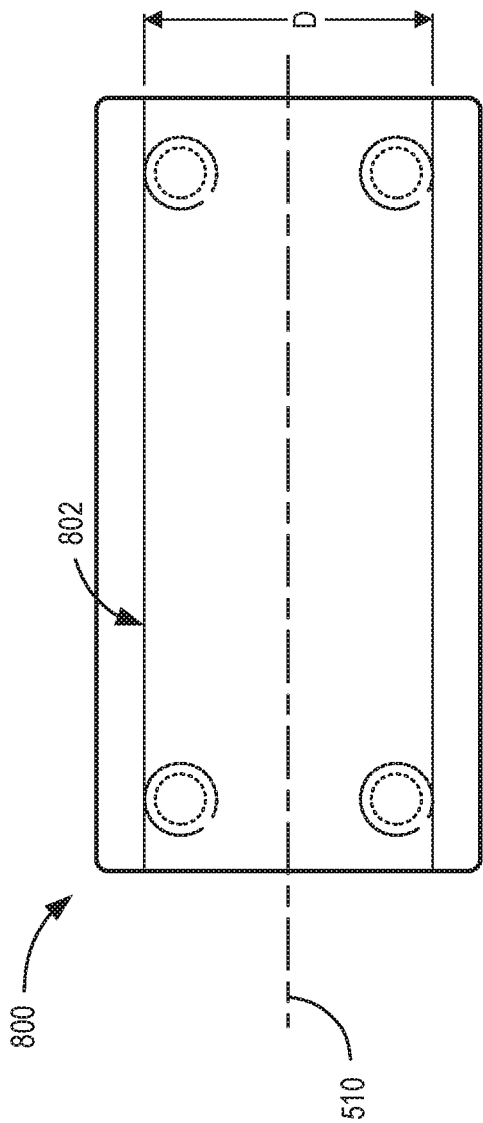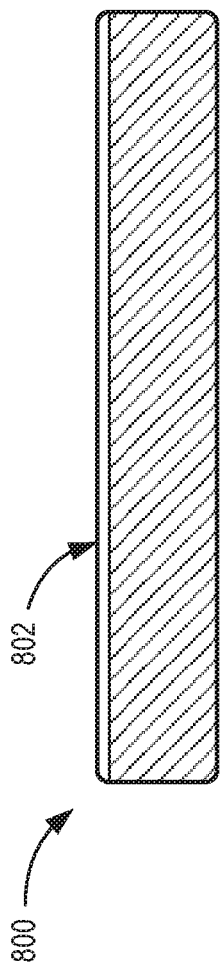

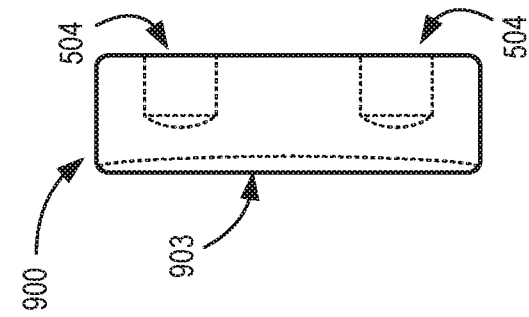
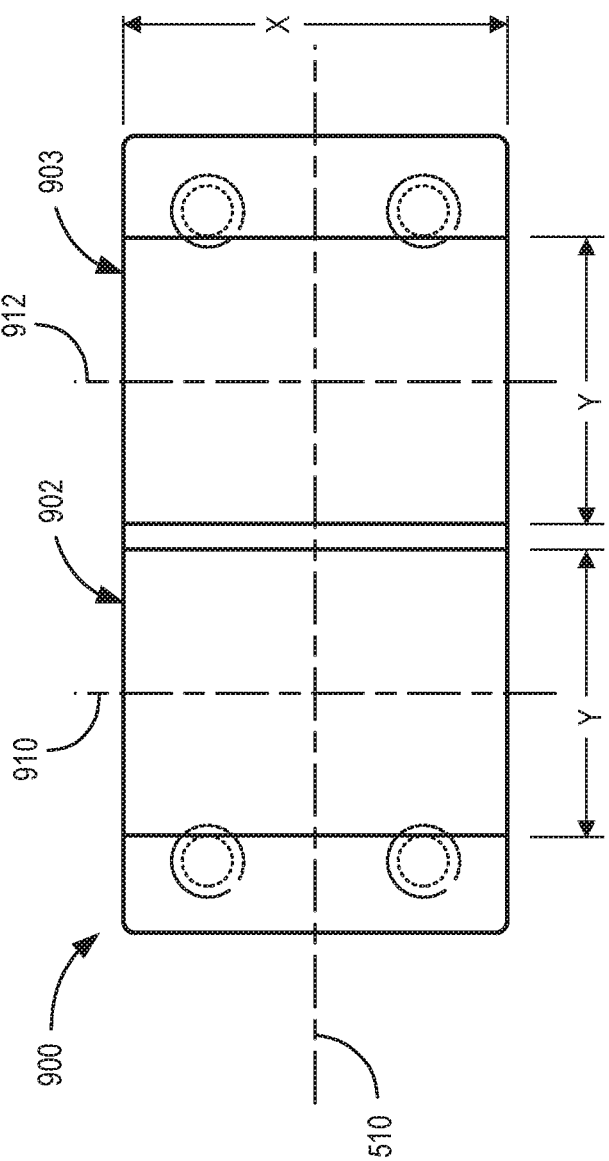
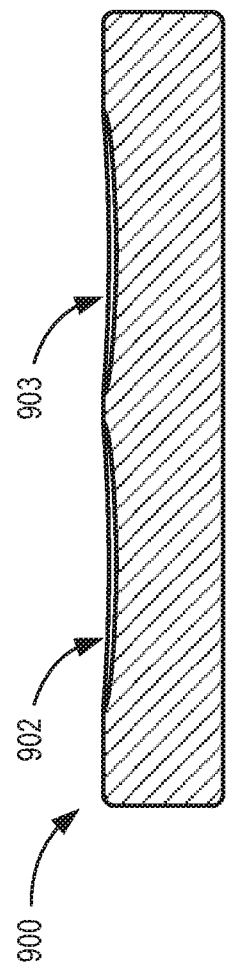
FIG. 9B
FIG. 9A
FIG. 9C

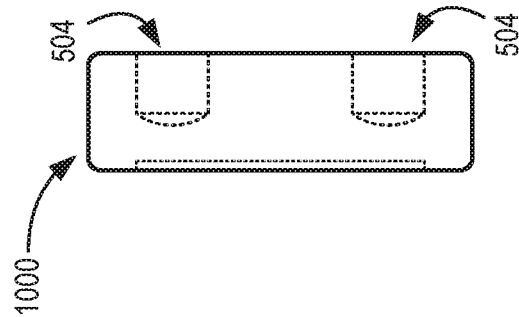
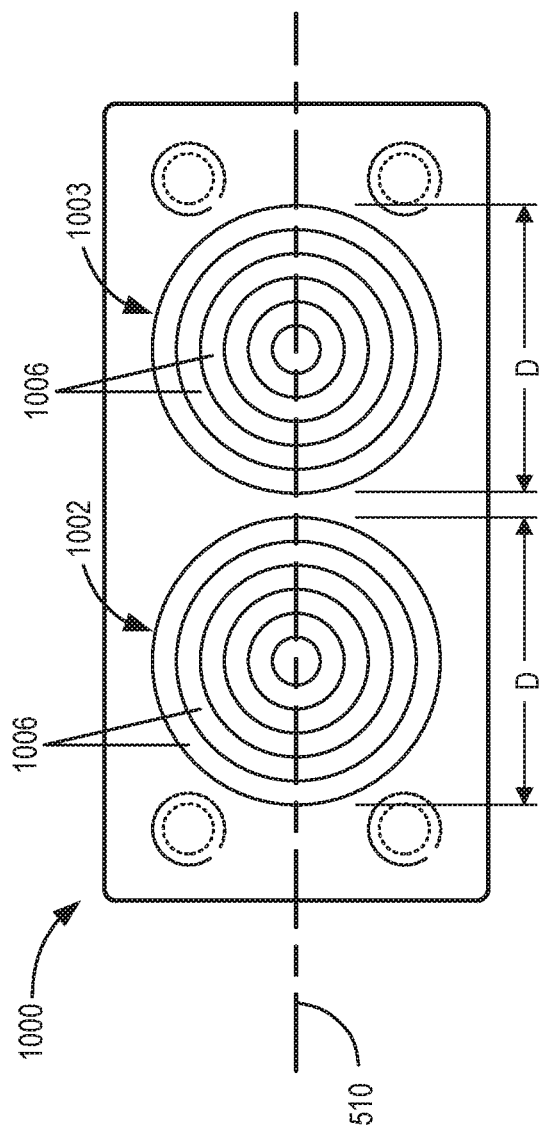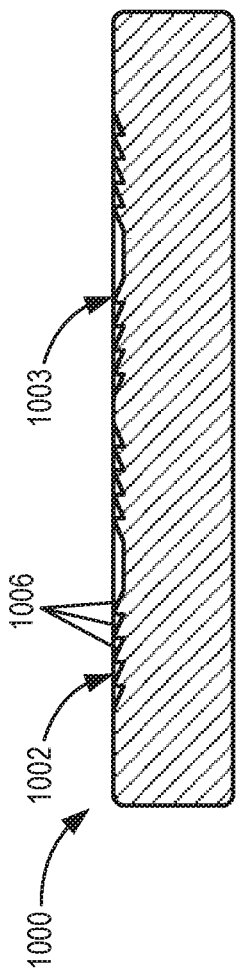

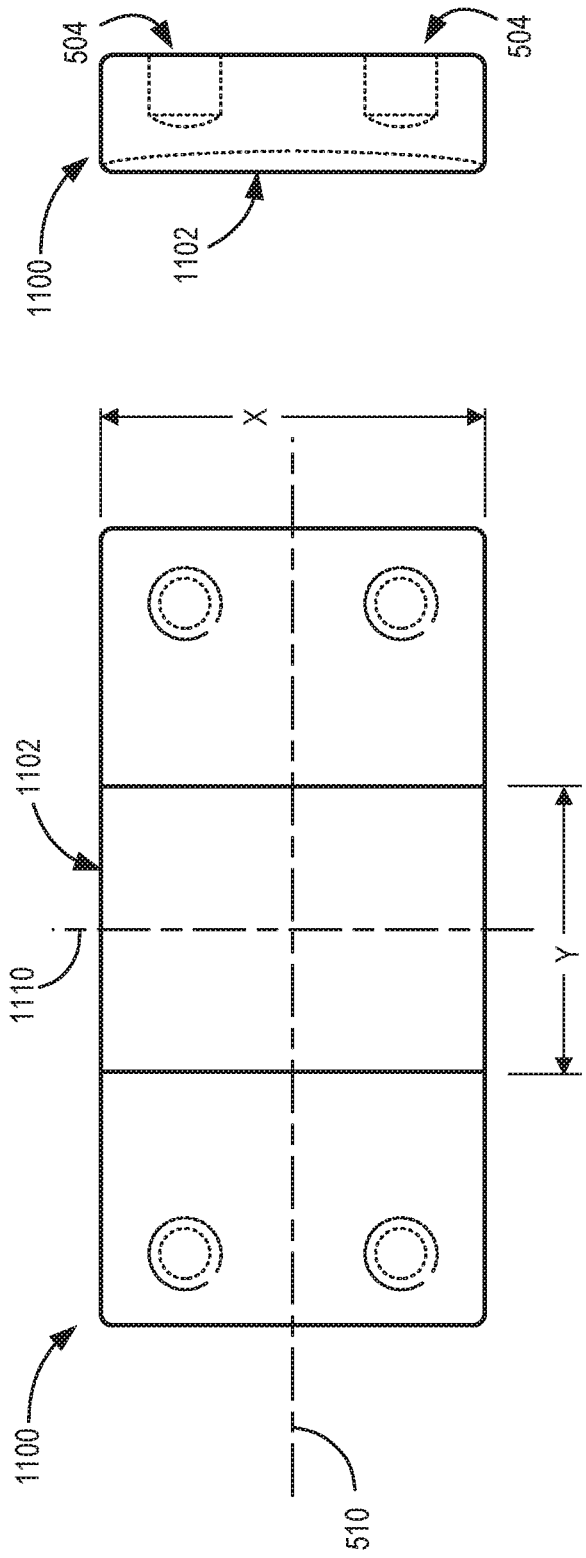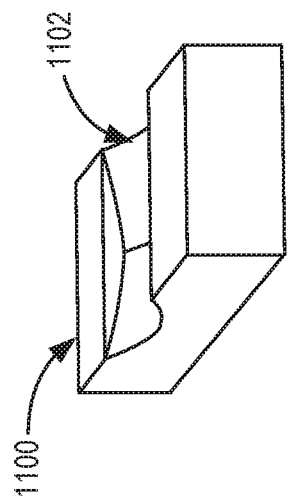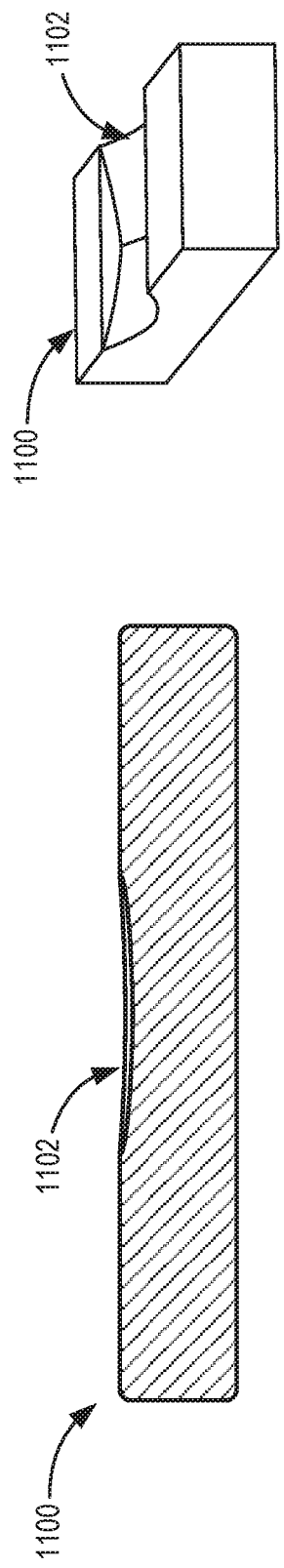

INTERCHANGEABLE ULTRASONIC MEASURING ELEMENT WITH REFLECTOR PLATE SITUATED IN AN IN-LINE PIPING SYSTEM OF A WATER METER

CROSS-REFERENCE TO RELATED APPLICATION

This application claims priority under 35 U.S.C. § 119, based on U.S. Provisional Patent Application No. 62/928,537 filed Oct. 31, 2019, titled "Unitized Measuring Element for Water Meter Assembly," the disclosure of which is hereby incorporated by reference.

BACKGROUND

The present application relates generally to water meters and more specifically to water meters that use solid state technology.

Water meters are typically used to measure water usage at a consumption site for billing and/or monitoring purposes. Water meter measurements are directly tied to revenue, which makes measurement integrity and reliability of every water meter a high priority. Solid state ultrasonic water meters generally include no moving parts, which helps to ensure long-term accuracy and reliability. Solid state ultrasonic water meters may be installed in-line with a piping system. In many cases, when a meter needs to be replaced (e.g., due to failure or lifecycle expiration) or be upgraded, the piping system is shut down and the entire in-line water meter segment is removed and replaced.

BRIEF DESCRIPTION OF THE DRAWINGS

FIG. 7A-7C are top, side and end views, respectively, of an acoustic reflecting plate set, according to another implementation;

FIGS. 8A-8C are top, side and end views, respectively, of an acoustic reflecting plate of FIG. 2, according to still another implementation;

FIGS. 9A-9C are top, side and end views, respectively, of an acoustic reflecting plate of FIG. 2, according to yet another implementation;

FIGS. 10A-10C are top, side and end views, respectively, of an acoustic reflecting plate of FIG. 2, according to another implementation;

FIGS. 11A-11D are top, side, end, and perspective views, respectively, of an acoustic reflecting plate of FIG. 2, according to an implementation for use with a single transducer pair;

DETAILED DESCRIPTION

The following detailed description refers to the accompanying drawings. The same reference numbers in different drawings identify the same or similar elements.

Systems and methods described herein provide a unitized measuring element (UME) for a water meter assembly. The UME may be removably installed within a main case, which may be permanently situated in-line with a monitored piping system. The UME may include solid state ultrasonic components to measure fluid flow through the UME. The systems and methods described herein allow for installation and/or replacement of the UME without removal of the main case (e.g., for a field installation) and without additional calibration. According to an implementation, all measuring components may be included within the UME to allow for interchangeability. For example, one UME may be swapped out with another UME (e.g., a replacement or upgrade) without disconnecting the main case from pipe sections to which the main case is attached.

According to one embodiment, the UME includes one or more two pairs of transducers that are mounted above a measuring channel. One or more reflector plates are mounted within a pocket or recess in a bottom wall of the measuring channel. Each of the transducer pairs are aligned to transmit ultrasonic signals between respective transducers of each pair using the reflector plates. The reflector plates include one or more reflective surfaces, such as a pair of spherical focusing mirrors, a pair of ellipsoidal focusing mirrors, a pair of Fresnel mirrors, or a cylindrical focusing mirror, to improve amplitude and reduce signal loss of the received signal from each transducer by the other transducer of a transducer pair.

According to one implementation, one pair of transducers may be positioned above a measuring channel. According to another implementation, two pairs of transducers may be aligned to create two parallel measuring paths at different places along the width of the measuring channel. In either implementation, the metal reflector plate may be mounted at the bottom of the measuring channel to reflect ultrasonic signals between the transducer pairs in substantially V-shaped measuring paths that extend through the entire depth (or height) of the measuring channel. The arrangement/alignment of the transducers and reflector plate within the UME allows for factory calibration of the UME and subsequent field installation (e.g., installation within a corresponding main case) without additional calibration. Furthermore, when parallel measuring paths are used, the parallel V-shaped measuring paths maximize exposure of the ultrasonic signals to fluid in the measuring channel and mitigate against possible non-uniformity of flow velocity within the measuring channel.

Figure 1:
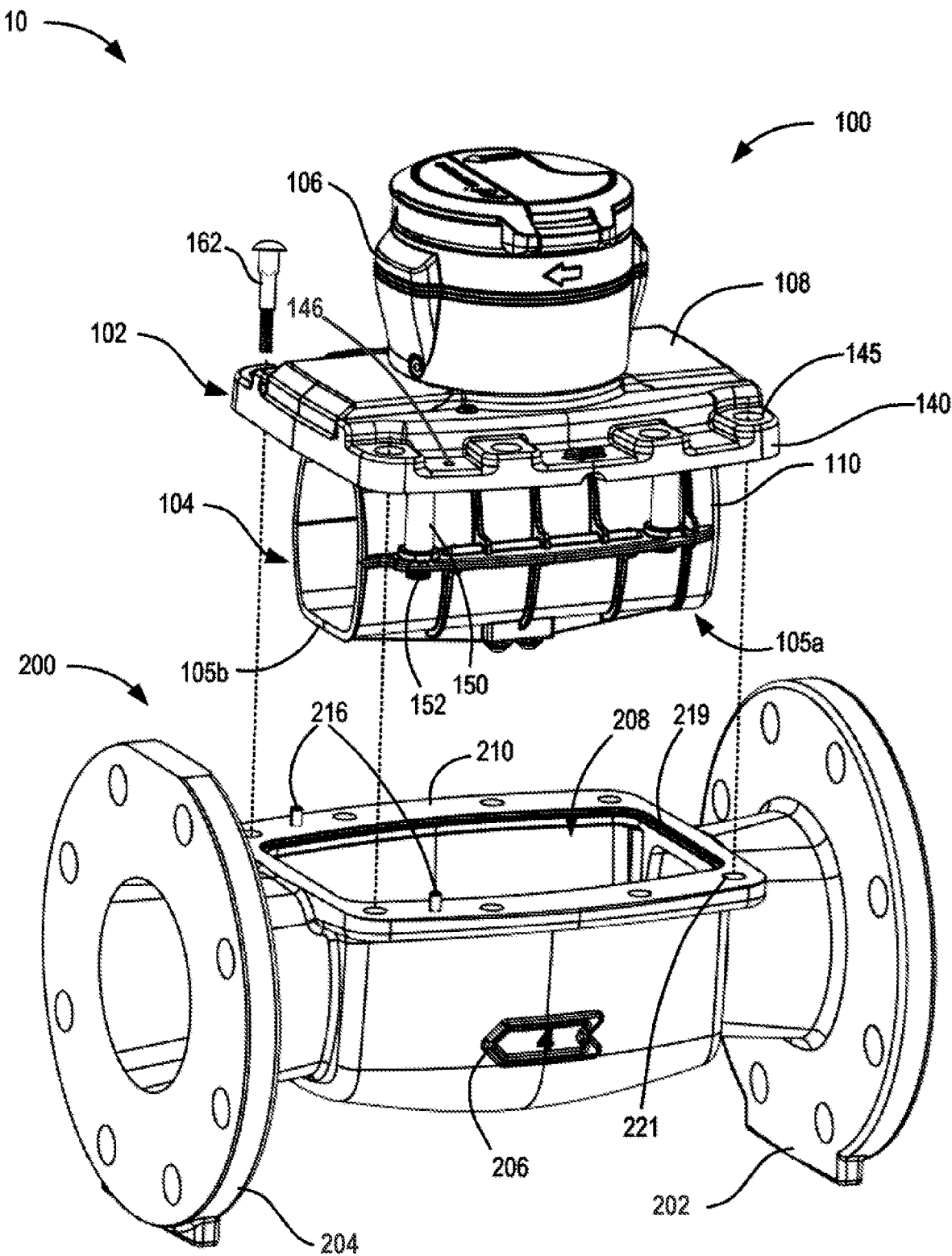
FIG. 1 is a partial assembly view of an embodiment of a water meter assembly, according to an implementation.

FIG. 1 is a partial assembly view of an embodiment of a water meter assembly 10. As shown in FIG. 1, water meter assembly 10 includes a UME 100 that may be inserted into a main case 200. UME 100 includes a cover 102 that supports a measuring channel 104, an electronics module 106, and a transducer cover 108. Main case 200 may be dimensioned to fit inline within a selected pipe system (e.g., a particular pipe diameter). Inlet flange 202 may be bolted, for example, to a corresponding flange (not shown) of the piping system, and outlet flange 204 be bolted, for example, to another corresponding flange (not shown) of the piping system, such that water flows through main case 200 in a desired flow direction, shown as arrow 206. Main case 200 may be configured with a cavity 208 into which a portion of UME 100 may be inserted.

Figure 2:
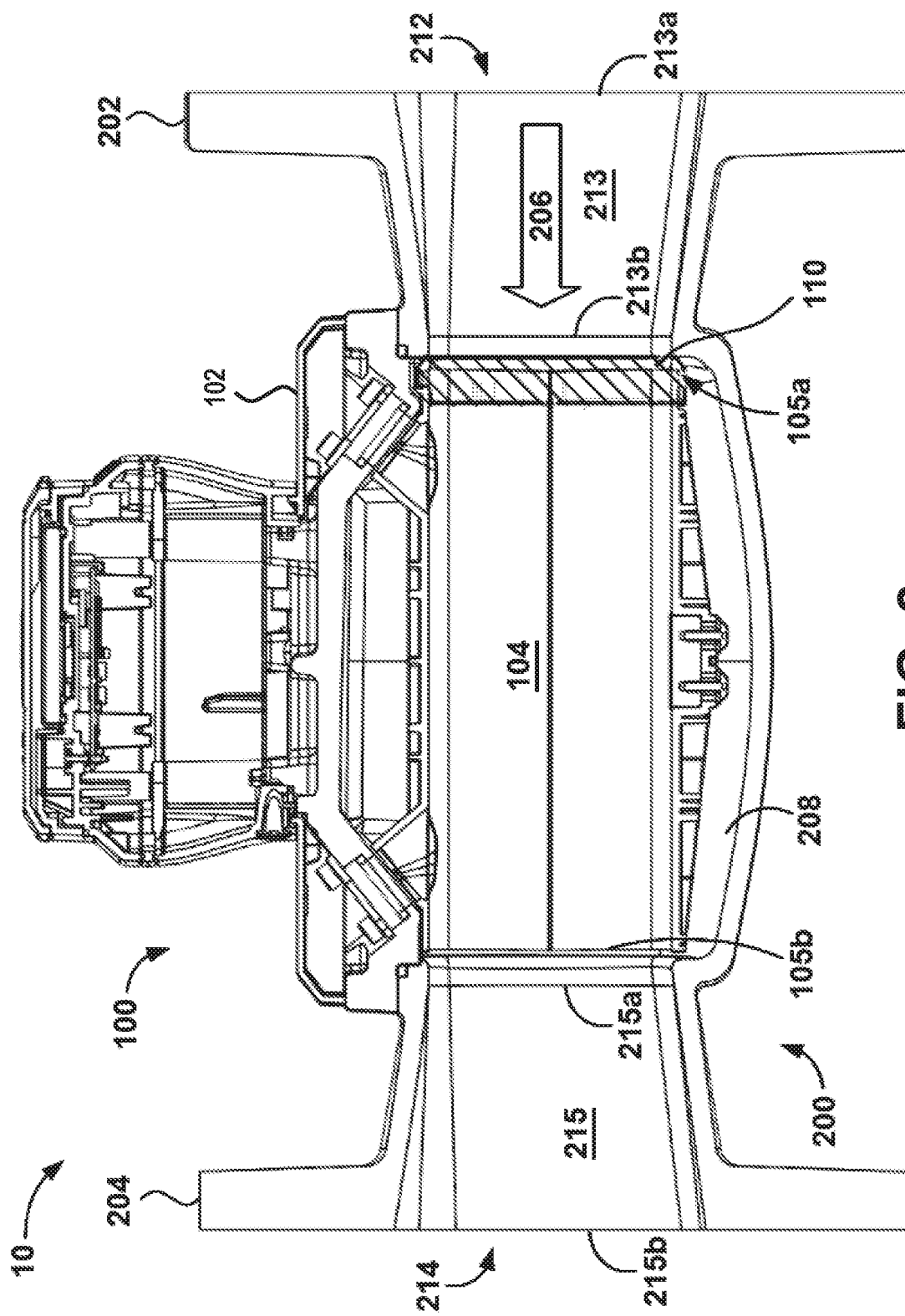
FIG. 2 is a longitudinal cross-sectional view of the assembled water meter assembly of FIG. 1.

As shown, for example, in FIG. 2, an entry section 212 extends from input flange 202 into cavity 208. Similarly, an exit section 214 extends from an opposite side of cavity 208 to outlet flange 204. Entry section 212 and exit section 214 may adjust the cross-sectional shape (i.e., the shape orthogonal to the flow direction) of the fluid flow path to permit accurate measurements by UME 100. Entry section 212 provides a channel 213 that gradually transitions a flow path from a circular cross-section at 213*a* (e.g., corresponding to a shape of the system inlet piping) to a substantially rectangular cross-section 213*b* that matches an inlet end 105*a* of measuring channel 104, as described further herein. According to one implementation, the ratio of the area of the substantially rectangular cross-section 213*b* to the area of the substantially circular cross-section 213*a* may be about 0.4 to 0.8. Exit section 214 provides a channel 215 that gradually transitions the flow path from the substantially rectangular cross-section 215*a* (i.e., that matches an outlet end 105*b* of measuring channel 104) to return to a circular cross section 215*b* with a diameter matching that of circular cross section 213*a*, for example. The design of the gradual transition in channel 213 may reduce pressure loss through measuring channel 104.

When inserted within cavity 208, measuring channel 104 is aligned with entry section 212 and exit section 214 (e.g., as shown in FIG. 2) such that water/fluid from the monitored piping system may flow into entry section 212, through measuring channel 104, and out exit section 214. Precision alignment of measuring channel 104 and entry section 212 (along with a seal ring 110, described below) prevents leakage of fluid past measuring channel 104 and permits accurate measurements by UME 100. In one aspect, the combination of design, material selection, and manufacturing processes described herein allow this precision alignment to be achieved, which allows for interchangeability of different UMEs 100 and main cases 200 without field calibration.

According to an implementation, main case 200 may be a cast component (e.g., bronze, stainless steel, etc.). Cover 102 may also be a cast component of the same or similar material. Alternatively, cover 102 may be made of a different material, such as a composite, thermoplastic, etc. Measuring channel 104 may be formed from an engineered polymer material, such as structurally rigid hard plastic material. Measuring channel 104 may be formed, for example, using an injection molding or 3D printing process. Measuring channel 104 may be formed, for example, as two halves that are secured together and fastened (e.g., bolted) to the underside of cover 102. Using an engineered polymer measuring channel 104 may allow for tighter tolerances and a more consistent cross-sectional flow path through measuring channel 104 (e.g., compared to tolerances that are typically achieved with metal castings) to provide for consistent performance and interchangeability of different UMEs 100 with main case 200. For example, typical sand casting tolerances are in the range of 0.030-0.200 inches, whereas typical tolerances for injection molding processes are in the range of 0.003-0.030 inches. According to another implementation, the plastic material of measuring channel 104 may reduce the possibility of build-up of foreign material (e.g., lime, calcium, etc.) over the lifetime UME 100. According to an implementation, the material forming measuring channel 104 may include Polyphenylene Ether (PPE), Polyphenylene Oxide (PPO) and/or high impact polystyrene (HIPS) reinforced with glass.

Referring to FIG. 2, a seal ring 110 may be affixed to the inlet end 105*a* of measuring channel 104, encircling the perimeter at inlet end 105*a*. Seal ring 110 may include a flexible material, such as a thermoplastic elastomer (TPE), to provide a face seal between measuring channel 104 and entry section 212. In another implementation, seal ring 110 may be formed of any suitable resilient material, such as a combination of polypropylene and ethylene-propylene-diene-monomer (EPDM), silicone, etc. When measuring channel 104 is inserted into cavity 208, seal ring 110 is pressed against the periphery of entry section 212 and prevents leakage of water outside of measuring channel 104 at the interface between measuring channel 104 and entry section 212. Seal ring 110 allows for greater dimensional variance between different UME 100 assemblies (e.g., than would be possible with a rigid material interface) to facilitate better interchangeability with main case 200.

Figure 3:
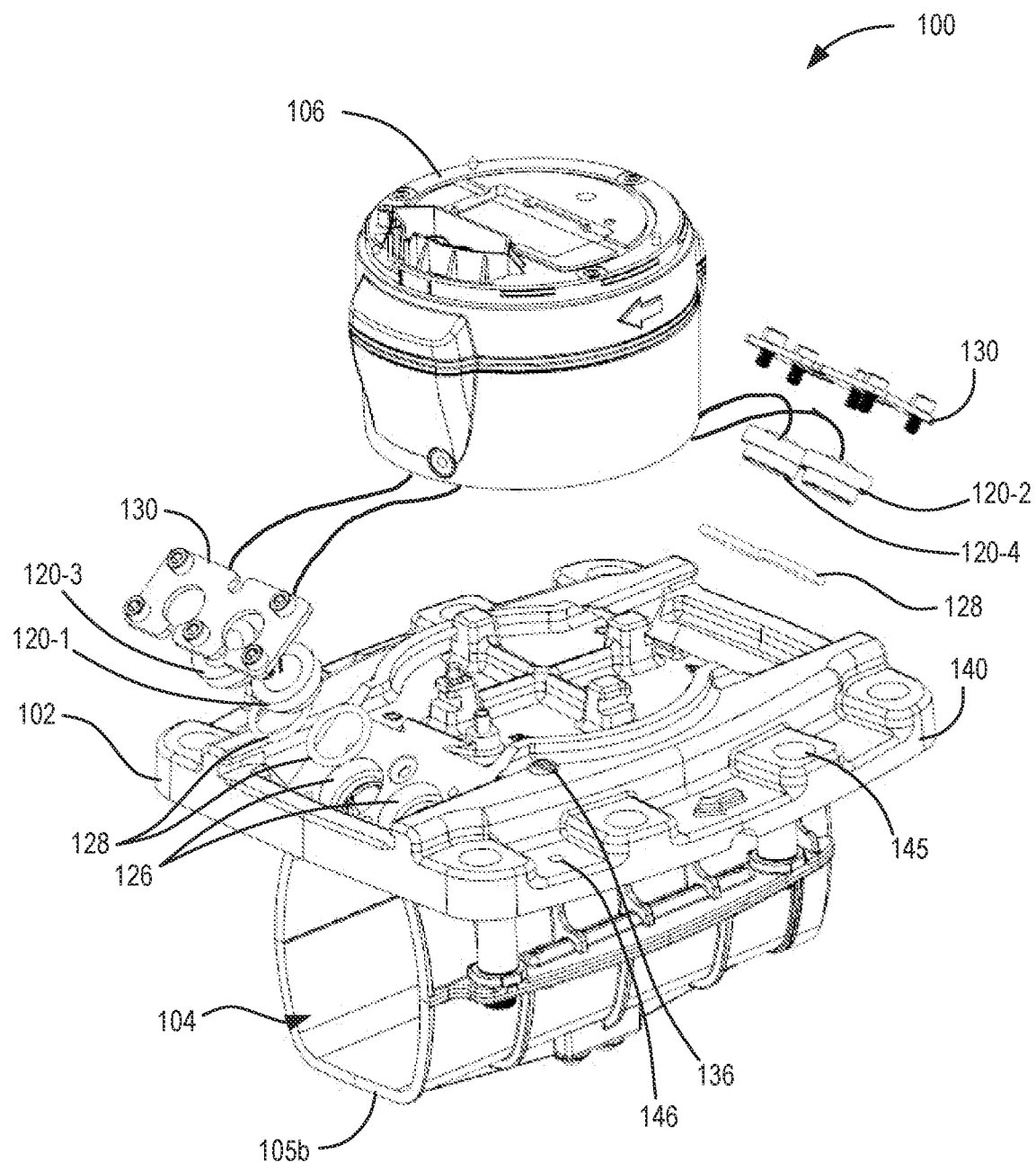
FIG. 3 is a partial assembly view of the unitized measuring element (UME) of FIG. 1.

FIG. 3 is a partial assembly view of UME 100, including cover 102, measuring channel 104, and electronics module 106 (transducer cover 108 is not shown). Electronics module 106 may include or be connected to ultrasonic transducers 120-1 through 120-4 (referred to collectively as "transducers 120" or generically as "transducer 120"). According to an embodiment, two transducers 120 on different points along the flow path (e.g., one closer to the inlet end 105*a* and another closer to the outlet end 105*b*) form a pair. Thus, in the example of FIG. 3, transducers 120-1 and 120-2 form one transducer pair and transducers 120-3 and 120-4 form another transducer pair. Each transducer 120 is directed to emit ultrasonic waves that reflect off an acoustic reflecting plate 124 (FIGS. 4A and 4B) mounted in a recess 160 of a bottom wall 112 (e.g., below the flow path) of measuring channel 104, and receive the reflected signal of the paired transducer 120. Thus, each of ultrasonic transducers 120 directs an ultrasonic signal from a same side (e.g., top wall 114) of measuring channel 104 toward reflecting plate 124 on an opposite side (e.g., bottom wall 112) of measuring channel 104. According to an implementation, acoustic reflecting plate 124 may be mounted so that a top surface 158 of acoustic reflecting plate 124 is substantially flush with an interior surface 154 of bottom wall 112.

Figure 4A:
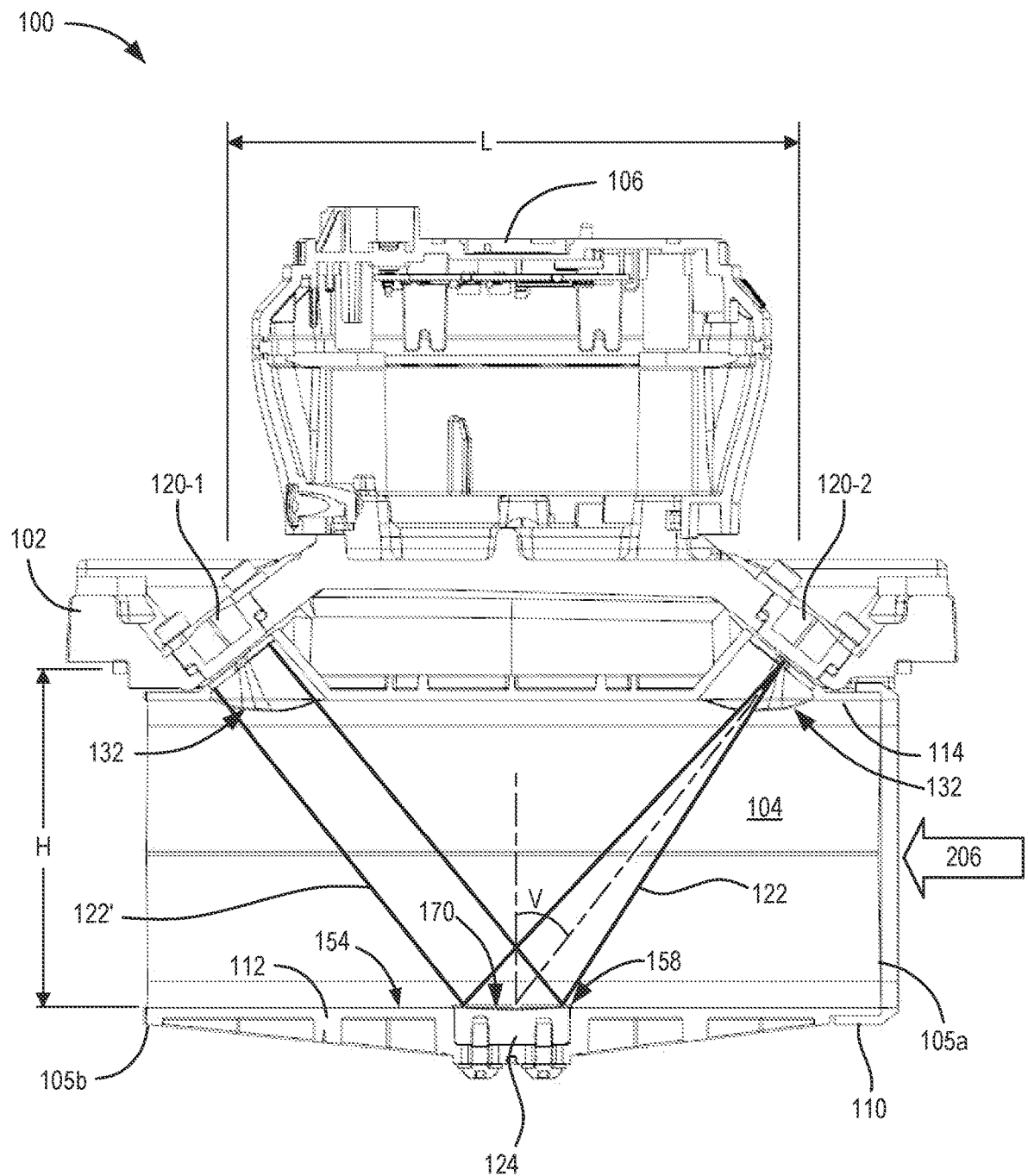
FIG. 4A is a longitudinal cross-sectional side view of the UME of FIG. 1.

As shown in FIG. 4A, to measure flow velocity, electronics module 106 may indicate the sending of a signal 122 (also referred to herein as a "transmit path") from an upstream transducer (e.g., transducer 120-2 or transducer 120-4) that reflects off reflector plate 124 as signal 122' (also referred to herein as a "reflective path") and is received at a downstream transducer (e.g., transducer 120-1 or transducer 120-3). Electronics module 106 may measure the time of flight of the signals 122/122' to reach the downstream transducer. Electronics module 106 may then send a signal (not shown) in the reverse direction (e.g., from transducer 120-1/120-3 to transducer 120-2/120-4 via reflector plate 124) and measure the time of flight of the reverse signal to reach the upstream transducer. The difference in travel times between the downstream signals 122/122' and the upstream signals may be used to determine the flow rate.

Figure 4B:
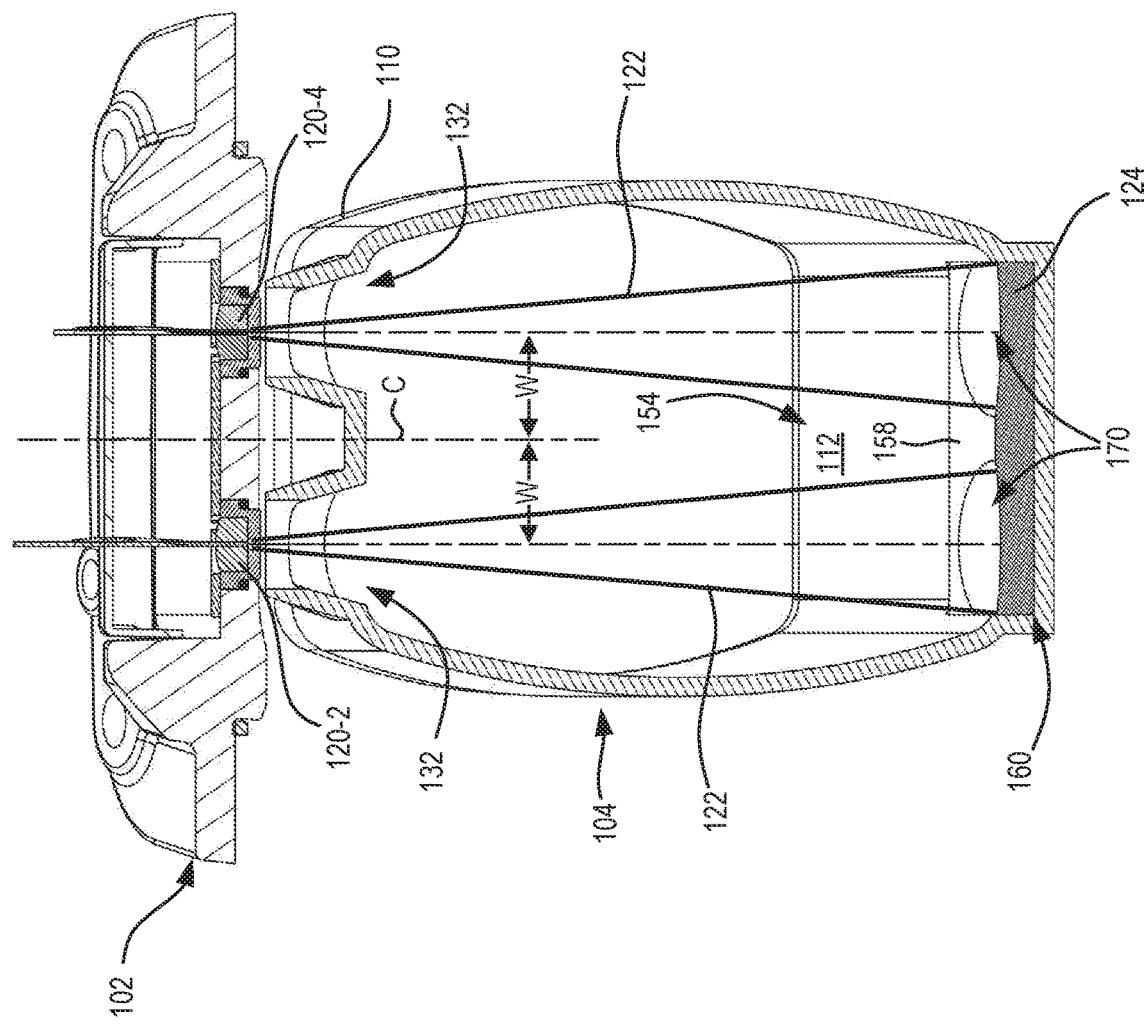
FIG. 4B is a perspective cross-sectional end view of the UME of FIG. 1.

As shown in the longitudinal cross-section view of FIG. 4A and perspective cross-sectional end view of FIG. 4B, the initial signal 122 from transducer 120-2 experiences beam spread as signal 122 traverses from transducer 120-2 to reflector plate 124. To minimize signal losses between transducer 120-2 and transducer 120-1, reflector plate 124 includes one or more focusing mirrors 170 (shown, for example, in various embodiments in FIGS. 5A-10C). According to an implementation, reflector plate 124 may include a material with high acoustic reflectivity, such as steel or stainless steel, and focusing mirror 170 may be machined directly into reflector plate 124. According to another implementation, steel plates (e.g., approximately 2 mm thick or more to disperse evanescent waves) may be used to form focusing mirrors 170, which may be mounted onto a reflector plate 124 formed from another material. In another implementation, the concavity formed by focusing mirror 170 may be filled with an acoustically-transparent material to provide a substantially continuous flat surface with interior surface 154 (FIG. 6) of bottom wall 112 in measuring channel 104. The size and radius (e.g., focal radius of curvature) of focusing mirror 170 may vary according to the dimensions (e.g., height, H) of measuring channel 104 and/or the orientation of transducers 120 (e.g., angle of reflection, V). As described further herein, non-limiting examples of focusing mirror 170 include a spherical concave reflector, an ellipsoidal concave reflector, a cylindrical concave reflector, a parabolic reflector, and a Fresnel reflector.

According to an implementation, transducers 120 and focusing mirror 170 may be configured such that, when a beam (e.g., signal 122) is transmitted from a first transducer (e.g., transducer 120-2 in the example of FIG. 4A), the beam is reflected by focusing mirror 170 such that a −6 decibel (dB) beam spread of the reflected beam (e.g., signal 122') is at least 90% incident on the face of a second transducer (e.g., transducer 120-1). Focusing mirror 170 may provide similar effect for signals in the opposite direction. Thus, when a beam is transmitted from the second transducer (e.g., transducer 120-2), focusing mirror 170 may reflect the beam such that a −6 dB beam spread of the reflected beam is at least 90% incident on the face of the first transducer (e.g., transducer 120-2).

As shown, for example, in FIG. 4B, transducer 120 pairs (e.g., transducer pair 120-1/120-2 and transducer pair 120-3/120-4) create substantially parallel transmit paths 122 and 123, which, accordingly also result in parallel reflective paths 122' and 123' (not shown). The combination of a transmit path (e.g., signal 122 or signal 123) and reflective path (e.g., signal 122' or 123') may be referred to as a measurement path. According to an implementation, transducer 120 pairs may be placed such that the centers of the measurement paths are equidistant from a lateral centerline, C. The distance, W, from the centerline, C, may be selected to place the measurement paths within a laminar flow area of the measured fluid. The parallel measurement paths may ensure signals 122/122' and 123/123' provide measurements of non-overlapping flow planes. The measurements of signals in the measurement paths may be averaged, for example, to minimize error.

The V-shaped measurement path permits mounting of all transducers 120 within cover 102 while minimizing the number of reflector plates 124 needed in measuring channel 104. Furthermore, in contrast with conventional water meters with reflectors mounted on the main case, reflector plate 124 is located within UME 100 and does not contact main case 200. Incorporation of reflector plate 124 into UME 100 may provide better interchangeability with different main cases 200 and UMEs 100. For example, locating reflector plates 124 in the molded measuring channel 104 provides better locational tolerance than attaching it to a cast main case or machined pocket in the main case. Consistent dimensions and calibration may be ensured during a UME manufacturing process, which also aids in interchangeability (e.g., to swap out different UMEs 100 into main case 200).

Figure 5B:
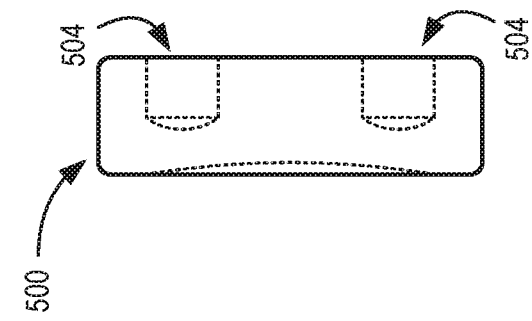
FIG. 5A-5C are top, side and end views, respectively, of an acoustic reflecting plate of FIG. 2, according to an implementation.
Figure 5A:
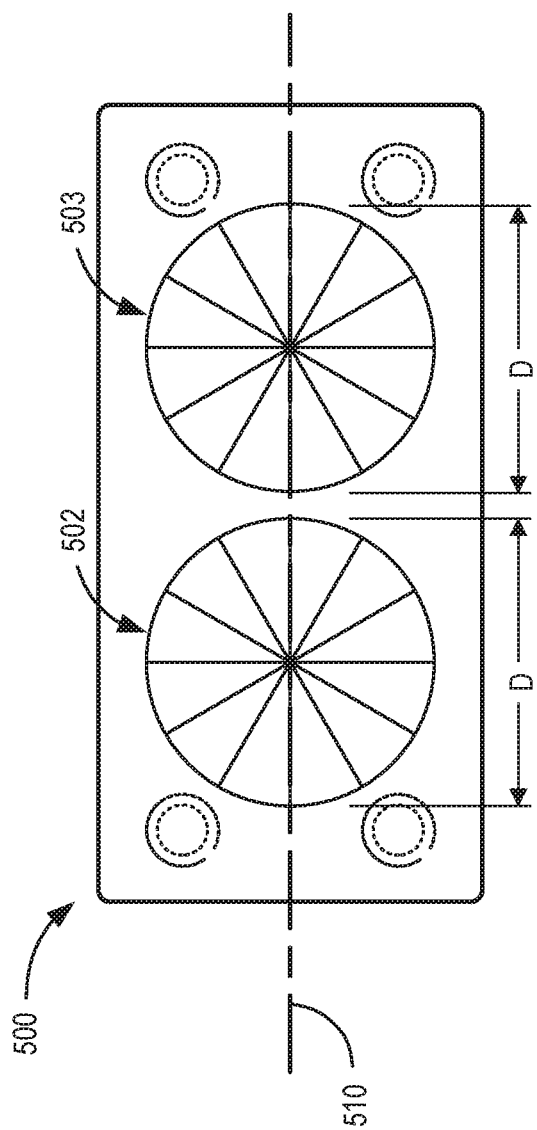
Figure 5C:
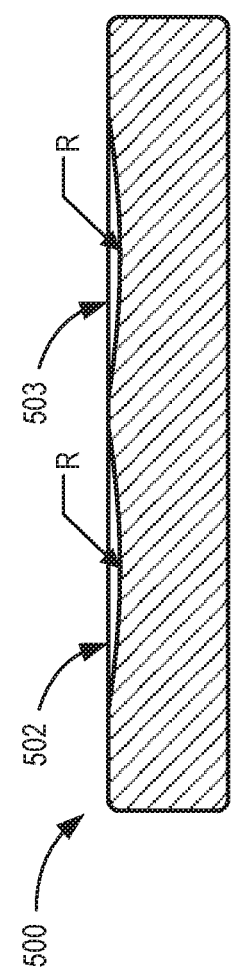

FIG. 5A is a simplified top view of a reflector plate 500, which may correspond to an embodiment of reflector plate 124 according to an implementation. FIGS. 5B and 5C provide a side view and a cross-sectional end view of reflector plate 500. Referring collectively to FIGS. 5A-5C, reflector plate 500 may include two spherical concave reflectors 502 and 503, and four mounting holes 504. Reflectors 502 and 503 may correspond to focusing mirrors 170. Reflectors 502 and 503 may be placed or formed within reflector plate 500 such that the centers of each reflector 502/503 are aligned along a line 510. When reflector plate 500 is installed within measuring channel 104, line 510 may extend orthogonally to flow path 206 and substantially parallel to the interior surface 154 of bottom wall 112 in measuring channel 104. For example, reflector 502 may reflect downstream signals 122 from transducer 120-2 (or upstream signals from transducer 120-1), and reflector 503 may reflect downstream signals 123 from transducer 120-4 (or upstream signals from transducer 120-3).

The focal radii, R, of reflectors 502 and 503 may vary with different UME applications according to the height, H, of transducers 120 above reflector plate 500 and/or the angle of reflection, V, between corresponding transducer 120 pairs. While the focal radii, R, of reflectors 502 and 503 is the same as shown in FIG. 5A, in other implementations the spacing of one transducer pair (e.g., transducers 120-1/120-2) may be different from another transducer pair (e.g., transducers 120-3/120-4) and the focal radius of each corresponding reflector 502/503 may also be different.

Each reflector 502/503 may have a diameter, D, configured to reflect an optimal portion of a respective signal 122/123 from transducer 120. According to an implementation, each reflector 502/503 may be configured to reflect at least a configured lateral beam spread of the originating signal (e.g., signal 122/123) toward the respective receiving transducer 120, where the configured beam spread is defined as distance spanning a beam axis that provides an intensity of −6 dB.

Figure 6:
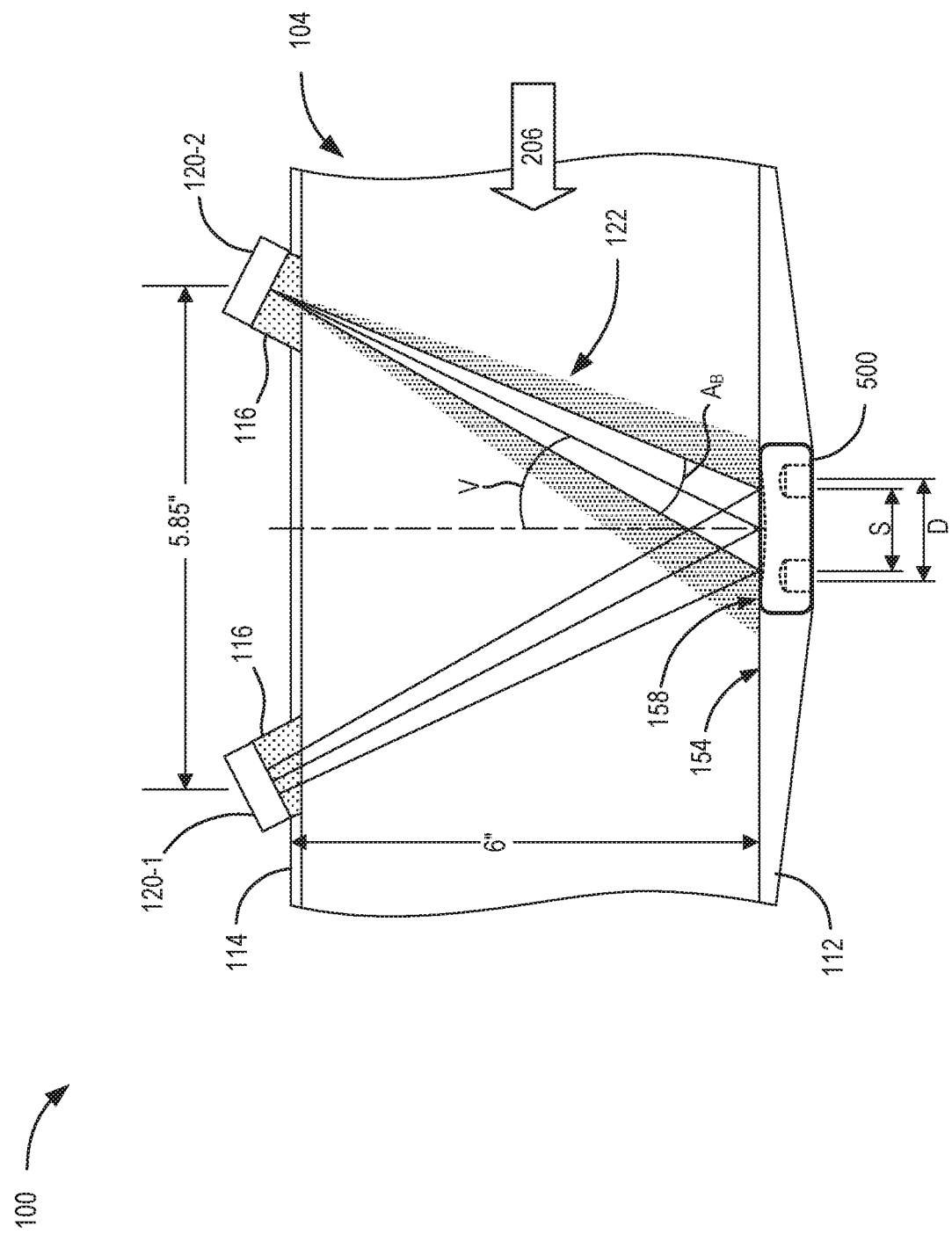
FIG. 6 is a simplified schematic of an exemplary transducer 120 arrangement in a UME of FIG. 1.

FIG. 6 provides a simplified schematic for a particular transducer 120 arrangement in UME 100, where the transmitting transducer 120-2 is a 1 megahertz (MHz) transducer with a beam angle, $A_B$, of 7.6° at −6 dB. As further shown in FIG. 6, transducer 120-2 may project signal 122 with an angle of reflection, V, of approximately 26 degrees. Assume UME 100 has transducers 120 at a height above reflector plate 500, H, of 6 inches (15.24 cm) with an axial distance, L, of 5.85 inches (14.86 cm) between transducer 120-2 and transducer 120-1. The diameter, D, of reflector 502/503 at the surface of reflector plate 500 would be greater than 1 inch (2.54 cm) to reflect the resultant beam spread, S, of about 1 inch (2.54 cm). In the example of FIG. 6, reflector 502/503 may have a focal radius, R, of about 10 inches (25.4 cm).

Still referring to FIG. 6, some portions of signal 122 may spread beyond the diameter of reflector 502/503 and reflect off a top surface 158 of reflector plate 500 or the other reflector 502/503. Thus, according to another implementation, top surface 158 may be contoured to prevent reflection of signal 122 indirectly toward a receiving transducer (e.g., transducer 120-1) via a side wall of measuring channel 104 or main case 200. Similarly, reflectors 502 and 503 may be spaced and/or oriented to limit reflection of signals from one transducer pair (e.g., transducers 120-1/120-2) toward the adjacent transducer pair (e.g., transducers 120-3/120-4).

FIG. 7A is a simplified top view of two reflector plates 700 and 701, which may correspond to an embodiment of reflector plate 124 according to another implementation. FIGS. 7B and 7C provide a side view and a cross-sectional end view of reflector plates 700 and 701. Referring collectively to FIGS. 7A-7C, each of reflector plates 700 and 701 may include a spherical concave reflectors 502 and 503, respectively, and four mounting holes 504. Reflectors 502 and 503 may correspond to focusing mirrors 170. Reflectors 502 and 503 may be placed or formed within corresponding reflector plates 700 and 701 such that the centers of each reflector 502/503 are aligned along a line 510. When reflector plates 700 and 701 are installed within measuring channel 104, line 510 may extend orthogonally to flow path 206 and substantially parallel to the interior surface 154 of bottom wall 112 in measuring channel 104. Similar to reflector plate 500 described above, reflector 502 may reflect downstream signals 122 from transducer 120-2 (or upstream signals from transducer 120-1), and reflector 503 may reflect downstream signals 123 from transducer 120-4 (or upstream signals from transducer 120-3). Configured in separate reflector plates 700 and 701, reflectors 502 and 503 may be individually adjustable to allow for more precise alignment during manufacturing.

FIG. 8A is a simplified top view of a reflector plate 800, which may correspond to an embodiment of reflector plate 124 according to yet another implementation. FIGS. 8B and 8C provide a side view and a cross-sectional end view of reflector plate 800. Referring collectively to FIGS. 8A-8C, reflector plate 800 may include a cylindrical concave reflector 802, and four mounting holes 504. Reflector 802 may correspond to focusing mirror 170. Reflector 802 may be placed or formed within reflector plate 800 such that the axis of reflector 802 extends orthogonally to flow path 206 and substantially parallel to the interior surface 154 of bottom wall 112 in measuring channel 104 when reflector plate 800 is installed within measuring channel 104. For example, reflector 802 may reflect downstream signals 122 from both transducer 120-2 and 120-4 (or upstream signals from transducer 120-1 and 120-3). The focal radii, R, of reflector 802 may vary with different UME applications according to the height, H, of transducers 120 above reflector plate 500 and/or the angle of reflection, V, between corresponding transducer 120 pairs. Reflector 802 may have a diameter, D, configured to reflect an optimal portion of a respective signal 122/123 from transducer 120 (e.g., a −6 dB beam spread of the reflected beam at least 90% incident on the face of a receiving transducer 120).

FIG. 9A is a simplified top view of a reflector plate 900, which may correspond to an embodiment of reflector plate 124 according to yet another implementation. FIGS. 9B and 9C provide a side view and a cross-sectional end view of reflector plate 900. Referring collectively to FIGS. 9A-9C, reflector plate 900 may include a set of ellipsoidal concave reflectors 902 and 903, and four mounting holes 504. Reflectors 902 and 903 may correspond to focusing mirrors 170. The surface of reflector 902/903 may be ellipsoidal with the beam centers of a respective transducer pair (e.g., transducers 120-1/120-2 or transducers 120-3/120-4) as the foci. Each of reflectors 902 and 903 may have curvature along two orthogonal axes. For example, reflector 902 may have an axis of curvature along line 510 and line 910, while reflector 903 may have an axis of curvature along line 510 and line 912. Reflectors 902 and 903 may be placed or formed within reflector plate 900 such that the centers of each reflector 902/903 are aligned along line 510. When reflector plate 900 is installed within measuring channel 104, line 510 may extend orthogonally to flow path 206 and substantially parallel to the interior surface 154 of bottom wall 112 in measuring channel 104.

The focal radii of reflectors 902 and 903, respective to lines 510/910 or lines 510/912 may vary with different UME applications according to the height, H, of transducers 120 above reflector plate 900 and/or the angle of reflection, V, between corresponding transducer 120 pairs.

Each reflector 902/903 may have a length, X, and a width, Y, configured to reflect an optimal portion of a respective signal 122/123 from transducer 120. Similar to descriptions above in connection with FIG. 6, in one an implementation, each reflector 902/903 may be configured such that a beam from a transducer 120 and reflected by reflector 1110 produces a −6 decibel (dB) beam spread of the reflected beam at least 90% incident on the face of a receiving transducer 120.

FIG. 10A is a simplified top view of a reflector plate 1000, which may correspond to an embodiment of reflector plate 124 according to yet another implementation. FIGS. 10B and 10C provide a side view and a cross-sectional end view of reflector plate 1000. Referring collectively to FIGS. 10A-10C, reflector plate 1000 may include a set of Fresnel reflectors 1002 and 1003, and four mounting holes 504. Reflectors 1002 and 1003 may correspond to focusing mirrors 170. Each of reflectors 1002 and 1003 may include a simple Fresnel structure with ring shaped steps 1006. The number, angle, and depth of ring shaped steps 1006 may vary with different UME applications according to the height, H, of transducers 120 above reflector plate 1000 and/or the angle of reflection, V, between corresponding transducer 120 pairs. Reflectors 1002 and 1003 may be placed or formed within reflector plate 1000 such that the centers of each reflector 1002/1003 are aligned along line 510. Similar to descriptions above, each of reflectors 1002/1003 may have a diameter, D, configured to reflect an optimal portion of a respective signal 122/123 from transducer 120.

FIG. 11A is a simplified top view of a reflector plate 1100, which may correspond to an embodiment of reflector plate 124 according to an implementation for use with a single transducer 120 pair. For example, reflector plate 1100 may be used when UME 100 is configured with a single transducer pair (e.g., transducers 120-1/120-2) longitudinally centered over measuring channel 104 (e.g., along lateral centerline, C, of FIG. 4B). FIGS. 11B, 11C, and 11D provide a side view, a cross-sectional end view, and a perspective view of reflector plate 1100. Referring collectively to FIGS. 11A-11D, reflector plate 1100 may include an ellipsoidal concave reflector 1102 and four mounting holes 504. Reflector 1102 may correspond to one of focusing mirrors 170. The surface of reflector 1102 may be ellipsoidal with the beam centers of the transducer pair (e.g., transducers 120-1/120-2) as the foci. Reflector 1102 may have curvature along two orthogonal axes. Reflector 1102 may be placed or formed within reflector plate 1100 such that the center of reflector 1102 is aligned at the intersection of lines 510 and 1110. When reflector plate 1100 is installed within measuring channel 104, line 510 may extend orthogonally to flow path 206 and substantially parallel to the interior surface 154 of bottom wall 112 in measuring channel 104.

Similar to reflectors 902/903, reflector 1110 may have a length, X, and a width, Y, configured to reflect an optimal portion of a signal 122 from transducer 120. Similar to descriptions above in connection with FIG. 6, in one an implementation, reflector 1100 may be configured such that a beam from a transducer 120 reflected by reflector 1110 produces a −6 decibel (dB) beam spread of the reflected beam at least 90% incident on the face of a receiving transducer 120. While FIGS. 11A-11D illustrate a single ellipsoidal concave reflector 1102 for use with a single transducer pair, in other implementations, a single spherical concave reflector (e.g., spherical concave reflector 502) or a single Fresnel reflectors (e.g., Fresnel reflector 1002) may be used.

Flow rates may be detected by electronics module 106 using the dual measurement paths between transducer 120 pairs. Electronics module 106 may include, for example, a battery, a temperature sensor, a processor, and a memory to store instructions. The instructions (e.g., software) may be used to interpret signals from transducers 120 and compute, for example, volume flow rate and total volume through measuring channel 104. Electronics module 106 may combine measurements from the two measurement paths (i.e., between the path from transducers 120-2 to 120-1 and the path from transducers 120-4 to 120-3) in a manner to improve the flow measurement accuracy. For example, two simultaneous measurements may be used along measurement paths 122/122' and 123/123' to account for asymmetry in the flow path through measuring channel 104. Potential non-uniformity of flow velocity within measuring channel 104 is mitigated by the use of dual measurement paths. Calculating the average measurement from dual paths, for example, may reduce measurement error. According to one implementation, electronics module 106 may provide near-simultaneous measurement of fluid velocity or flow rate that provides a more representative estimate of the average velocity through measuring channel 104 than a single direct measurement.

As shown, for example, in FIG. 3, cover 102 may include individual mounting holes 126 into which a gasket 128 and one of transducers 120 may be inserted. Mounting holes 126 may align with ports 132 (FIG. 4A) in measuring channel 104 to permit acoustic signals from transducers 120 to enter and exit measuring channel 104. According to an implementation, each of ports 132 may include an acoustically transparent material 116 (FIG. 6) at the interface of port 132 and a top wall 114 of measuring channel 104. The acoustically transparent material 116 may be substantially flush with top wall 114 of measuring channel 104. The acoustically transparent port material 116 may reduce head loss of fluid in the flow path that would otherwise occur due to open port holes. In one example, the acoustically transparent port material 116 may include, for example, Polyurethane or Room-Temperature-Vulcanizing (RTV) Silicone.

A plate 130 may be placed over transducers 120 and attached to cover 102 to secure transducers in mounting holes 126. In one implementation, one plate 130 may be secured over transducers 120 on each side (e.g., transducers 120-1 and 120-3 under one plate 130, and transducers 120-2 and 120-4 under another plate 130). The location of mounting holes 126 on cover 102 and ports 132 on measuring channel 104 allow for top-mounting of transducers 120, which permits simplified assembly from outside measuring channel 104. The angled installation of mounting holes 126 and ports 132 also enables use of standard (e.g., non-wedge) transducers 120, while still providing angled measurement paths 122/122' and 123/123'. Furthermore the location of ports 132 positions all transducers 120 near the rest of electronics module 106 so that transducers 120 can more easily be part of a potted electronics assembly. Thus, in an exemplary embodiment, UME 100 can be assembled with top mounted transducers 120 installed in a dual measurement path configuration and sealed against water intrusion (or potted) as a separate component from main case 200.

To assemble meter assembly 10, UME 100 may be inserted into cavity 208 of main case 200. Guide holes 146 in flange 140 may receive alignment pins 216 extending from flange 210 to assist with alignment and orientation of UME 100. Holes 145 of flange 140 align with holes 221 of flange 210. Fasteners (e.g., bolts 162, washers, nuts, etc., not shown) may be inserted through holes 145 and holes 221 to secure cover 102 to main case 200. Accordingly, measuring channel 104 is aligned within cavity 208, but is not directly fastened to the main case 200.

Figure 12:
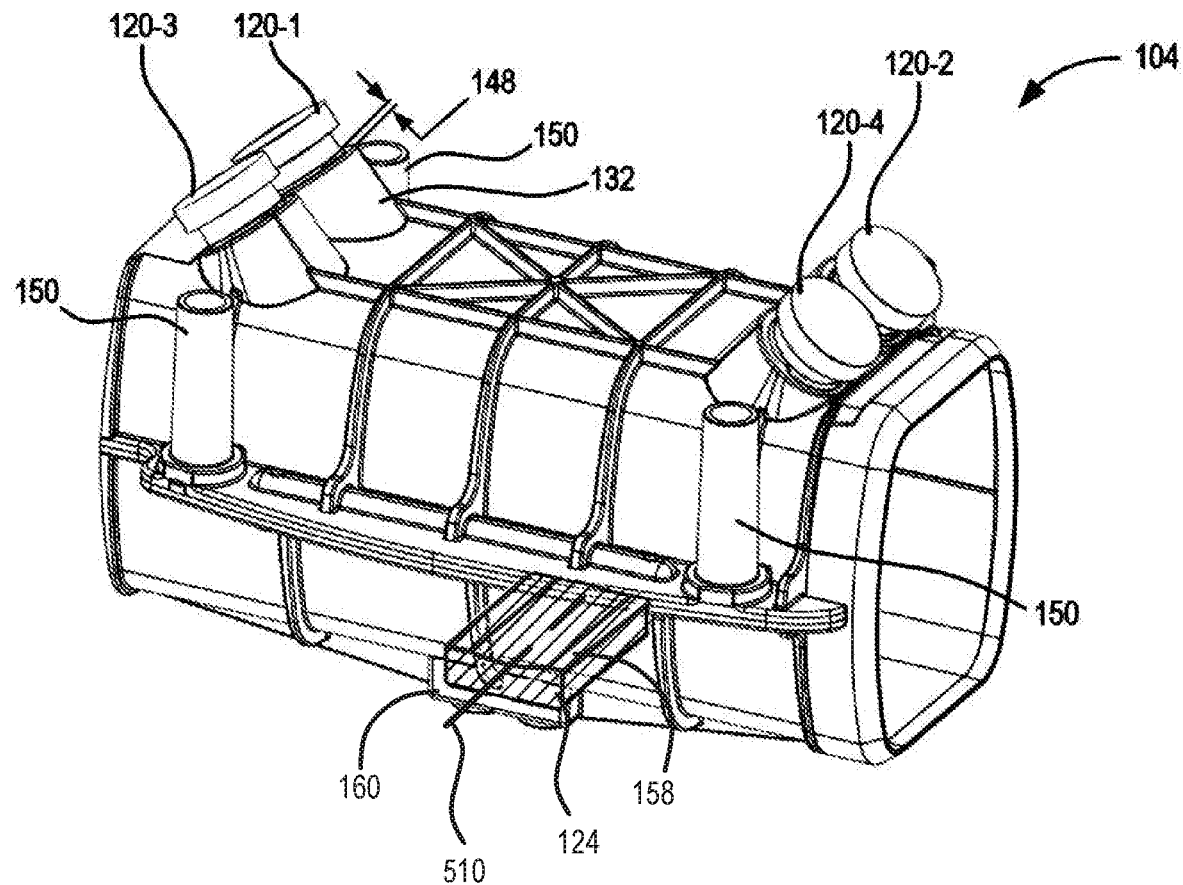
FIG. 12 is a perspective view of the measuring channel of FIG. 1 with a reflector plate and transducers.

FIG. 12 is a perspective top view of measuring channel 104 with reflector plate 124 installed and transducers 120 aligned with respective ports 132. When assembled, transducers 120 sit in or are located within mounting holes 126 and are supported by cover 102 without contacting ports 132/measuring channel 104. An air gap 148 separates each transducer 120 from each port 132. The spacing between the top of measuring channel 104 and the bottom of cover 102 (and thus the dimension of air gap 148) is governed in part by the length of bolt guides 150. For example, bolts/screws 152 (FIG. 1) may be inserted through the bottom of bolt guides 150 and threaded into cover 102 to secure measuring channel 104 to cover 102 with desired spacing. According to one non-limiting example, air gap 148 may be about 0.05 inches.

Figure 13:
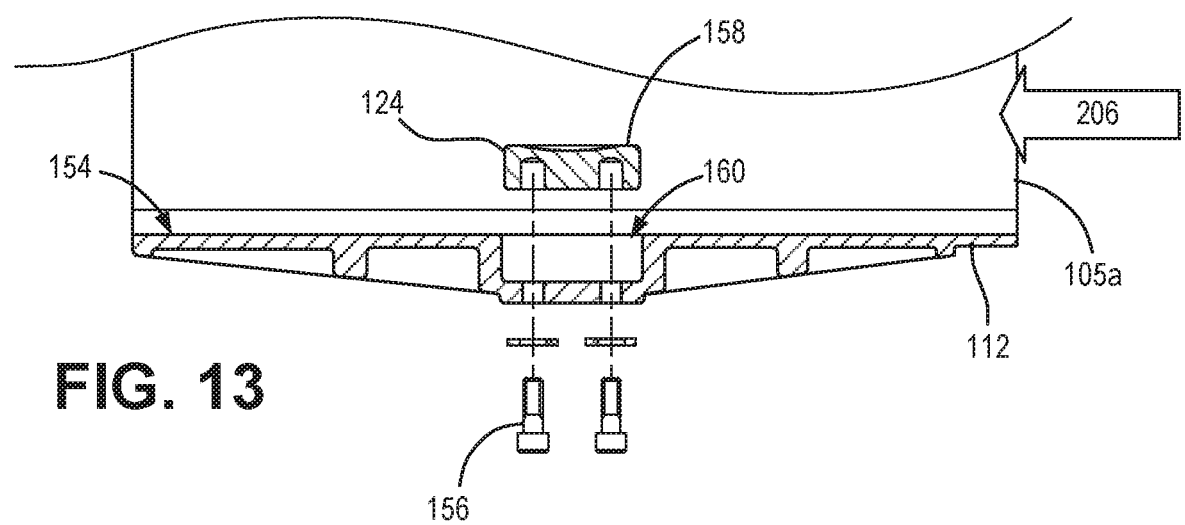
FIG. 13 is a partial cross-sectional assembly view of the measuring channel of FIG. 1 and the acoustic reflecting plate of FIGS. 8A-8C.
Figure 14:
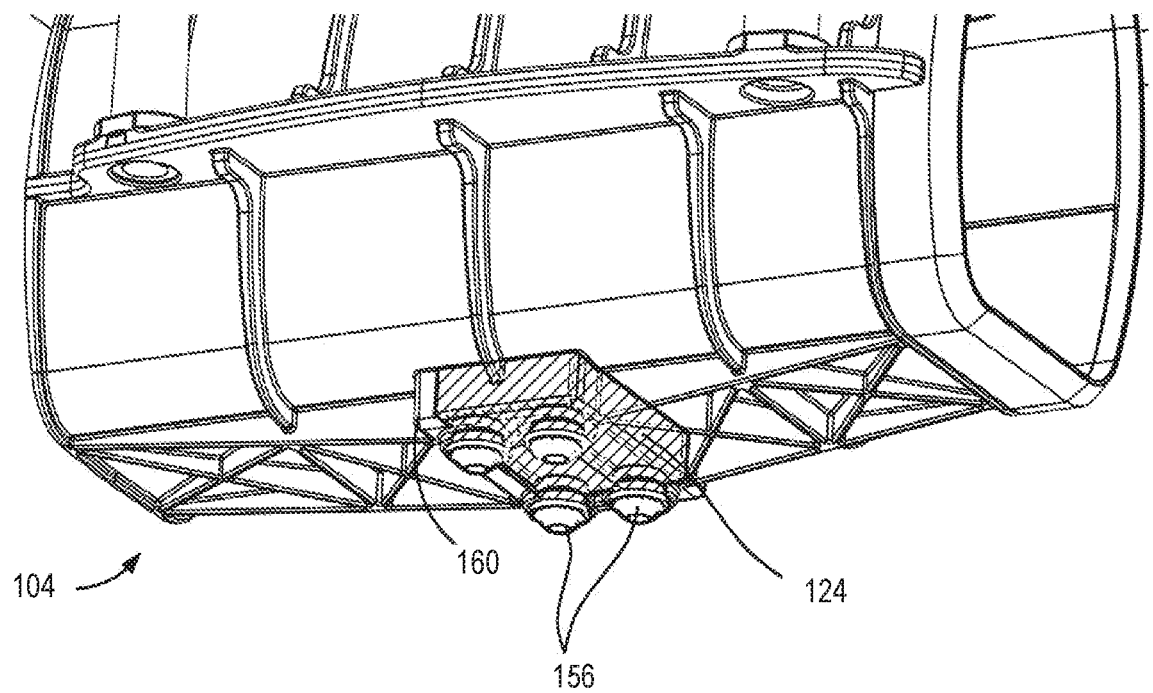
FIG. 14 is a partial bottom perspective view of the measuring channel of FIG. 1 with the reflector plate installed.

FIG. 13 is a simplified partial cross-sectional assembly view of measuring channel 104 with reflector plate 124. FIG. 14 is a partial perspective bottom view of measuring channel 104 with reflector plate 124 installed. As shown in FIGS. 12 and 13, a recess or pocket 160 may be formed within bottom wall 112 of measuring channel 104. Reflector plate 124 may be secured within pocket 160 below or even with a bottom interior surface 154 of measuring channel 104. As noted above, the location of pocket 160 is configured to position reflector plate 124 for enabling V-shaped parallel measurement paths 122/122' and 123/123' between transducer 120 pairs. In one implementation, reflector plate 124 may be secured within measuring channel 104 such that a top surface 158 of reflector plate 124 is substantially flush with bottom interior surface 154 so as to not disrupt the flow path of fluid through measuring channel 104. In one implementation, reflector plate 124 may be secured in pocket 160 using screws 156. In other implementations, reflector plate 124 may be held in place via an interference fit, clips, adhesives, or another type of fastener.

Figure 15:
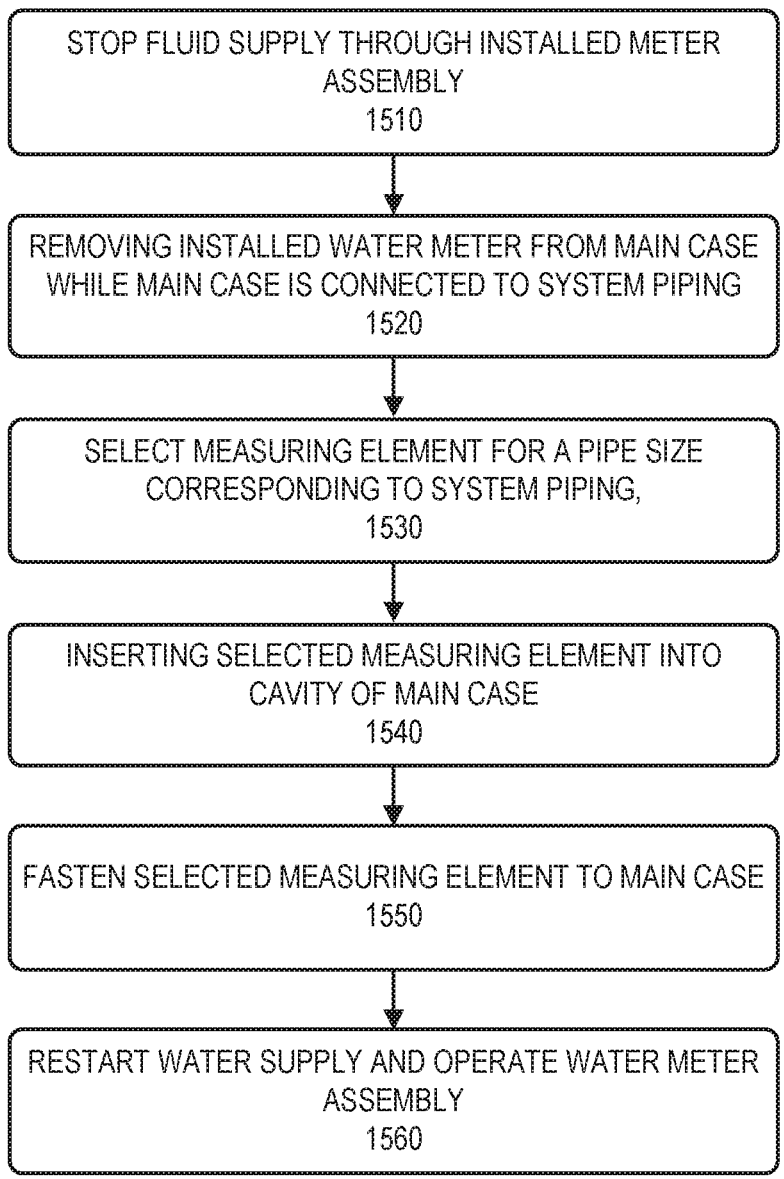
FIG. 15 is a flow diagram illustrating an exemplary process for replacing a water meter assembly as a field installation, according to an implementation described herein.

Referring to FIG. 15, according to an implementation, UME 100 may be replaced as a field installation. For example, a technician may stop a fluid supply through an installed meter assembly, such as water meter assembly 10 (block 1510). With the fluid supply stopped/turned off, pressure in the system (e.g., including pressure in water meter assembly 10) may be relieved, and then the technician may remove bolts (e.g., bolts 162) that secure flange 140 of UME 100 to flange 210 of main case 200. With the bolts removed, a technician may extract UME 100 from main case 200 while main case 200 remains connected to the piping system (block 1520). The technician may select a new UME 100 (e.g., a replacement UME 100, an upgraded UME 100, etc.) that is configured for the size of the piping system (block 1530) and position the new UME 100 so that measuring channel 104 is inserted into cavity 208 (block 1540). A technician may re-install bolts 162 to secure flange 140 of the new UME 100 to flange 210 of main case 200 (block 1550). Once the bolts are secured, the water supply for the piping system may be turned on, allowing for flow through water meter assembly 10 (block 1560). Thus, the new UME 100 may be inserted into a previously installed main case 200 and operated without the need for additional alignment or calibration (e.g., for transducers 120 and/or focusing mirrors 170). Systems and methods described herein provide a UME for a water meter assembly. The UME may be interchangeably installed within a main case that is permanently situated in-line with a monitored piping system. According to an implementation, the UME may include a measuring channel, an electronics module, and an acoustic reflector plate. The measuring element has a top wall with multiple ports and a bottom wall with a recess. The electronics module is mounted above the top wall. The electronics module includes one or more pairs of ultrasonic transducers configured to transmit ultrasonic signals through the multiple ports into the measuring channel, and a processor to calculate a flow value based on the transmitted ultrasonic signals from the one or more pairs of ultrasonic transducers. The acoustic reflector plate is mounted in the recess and includes at least one concave reflector that reflects the transmitted ultrasonic signals between the one or more pairs of ultrasonic transducers.

According to another implementation, the UME may include a measuring channel, a cover, an electronics module, and an acoustic reflector plate. The measuring channel, formed from a first material, and has a top wall with multiple ports and a bottom wall. The cover, formed from a second material, includes a flange configured to be mounted to a main case that has a cavity to receive the measuring element. The electronics module may be coupled to a different side of the cover. The electronics module may include one or more pairs of ultrasonic transducers configured to transmit ultrasonic signals through the multiple ports into the measuring channel and a processor to calculate a flow value based on the transmitted and received ultrasonic signals. In one implementation, two pairs of transducers may generate parallel transmit paths. The acoustic reflector plate may be mounted to the bottom wall of the measuring channel. The acoustic reflector plate includes at least one reflector, formed from a concavity in the reflector plate, that reflects the transmitted ultrasonic signals between the one or more pairs of ultrasonic transducers.

The foregoing description of implementations provides illustration and description, but is not intended to be exhaustive or to limit the invention to the precise form disclosed. Modifications and variations are possible in light of the above teachings or may be acquired from practice of the invention. For example, while some aspects have been described in the context of replacing an installed UME with a new UME, in other implementations, a UME as described herein may be installed to replace a mechanical or other legacy meter.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A measuring element for a metering assembly comprising:
   a measuring channel, comprising a top wall with multiple ports and a bottom wall with a recess;
   an electronics module mounted above the top wall of the measuring channel, the electronics module including:
      one or more pairs of ultrasonic transducers configured to transmit ultrasonic signals through the multiple ports into the measuring channel, and a processor to calculate a flow value based on the transmitted ultrasonic signals from the one or more pairs of ultrasonic transducers; and at least one acoustic reflector plate mounted within the recess, wherein the at least one acoustic reflector plate includes at least one focusing mirror, formed in a top surface of the at least one acoustic reflector plate, that is configured to reflect the transmitted ultrasonic signals between the one or more pairs of ultrasonic transducers, and wherein the measuring element is configured to be installed in a main case and operated without field calibration.

2. The measuring element of claim 1, wherein the one or more pairs of ultrasonic transducers include at least two pairs of ultrasonic transducers.

3. The measuring element of claim 2, wherein the at least two pairs of ultrasonic transducers and the at least one focusing mirror provide substantially parallel signal paths.

4. The measuring element of claim 1, wherein the at least one focusing mirror comprises a spherical concave reflector.

5. The measuring element of claim 1, wherein the at least one focusing mirror comprises a concave ellipsoidal reflector.

6. The measuring element of claim 1, wherein the at least one focusing mirror comprises two focusing mirrors aligned along a line that extends orthogonally to a flow path of the measuring channel and parallel to the bottom wall.

7. The measuring element of claim 1, wherein the at least one focusing mirror comprises a cylindrically concave reflector having an axis that extends orthogonally to a flow path of the measuring channel.

8. The measuring element of claim 1, wherein a transmit path and a reflective path between the one or more pairs of ultrasonic transducers form a V-shape.

9. The measuring element of claim 1, wherein the t top surface is contoured to prevent reflection of transmitted signal indirectly toward a receiving transducer of the one or more pairs of ultrasonic transducers.

10. The measuring element of claim 1, further comprising:

a cover configured to be fastened to the main case, the main case including a cavity to receive the measuring element, wherein the measuring channel is secured to the cover, and wherein, when the measuring channel is fastened to the main case, the measuring channel extends below the cover into the cavity.

11. The measuring element of claim 10, wherein the measuring channel comprises a polymer material, and wherein the cover comprises a metal casting.

12. The measuring element of claim 1, wherein the acoustic reflector plate comprises stainless steel.

13. The measuring element of claim 1, wherein the at least one focusing mirror and the at least one pair of transducers are configured such that:

when a beam of ultrasonic signals is transmitted from a first transducer of the pair of transducers, the beam is reflected by the reflector such that a −6 dB beam spread of the reflected beam is at least 90% incident on a face of a second transducer of the pair of transducers.

14. The measuring element of claim 13, wherein the at least one focusing mirror and the at least one pair of transducers are arranged such that:

when another beam of ultrasonic signals is transmitted from the second transducer, the other beam is reflected by the reflector such that a −6 dB beam spread of the reflected other beam is at least 90% incident on a face of the first transducer.

15. A measuring element for a metering assembly comprising:

a measuring channel comprising a first material, the measuring channel comprising a top wall with multiple ports and a bottom wall with a recess;

a cover comprising a second material, the cover including a flange configured to be mounted to a main case, the main case including a cavity to receive the measuring element;

an electronics module coupled to the cover, the electronics module including:

two pairs of ultrasonic transducers configured to transmit ultrasonic signals through the multiple ports into the measuring channel, and a processor to calculate a flow value based on the transmitted ultrasonic signals from the two pairs of ultrasonic transducers; and at least one acoustic reflector plate mounted within the recess, wherein the at least one acoustic reflector plate includes at least one focusing mirror, formed in a top surface of the at least one acoustic reflector plate, that is configured to reflect the transmitted ultrasonic signals between the two pairs of ultrasonic transducers, and wherein the measuring element is configured to be installed in the cavity of the main case and operated without field calibration.

16. The measuring element of claim 15, wherein the at least one focusing mirror comprises a concave ellipsoidal reflector.

17. The measuring element of claim 15, wherein the at least one focusing mirror does not contact the main case.

18. The measuring element of claim 15, wherein the at least one focusing mirror and the at least one pair of transducers are configured such that:

when a beam of ultrasonic signals is transmitted from a first transducer of the pair of transducers, the beam is reflected by the reflector such that a −6 dB beam spread of the reflected beam is at least 90% incident on a face of a second transducer of the pair of transducers, and when another beam of ultrasonic signals is transmitted from the second transducer, the other beam is reflected by the reflector such that a −6 dB beam spread of the reflected other beam is at least 90% incident on a face of the first transducer.

19. A method for performing a field installation of a measuring element for a water meter assembly, the method comprising:

removing an installed water meter from a main case while the main case is connected to system piping;

selecting a replacement measuring element for a pipe size corresponding to the system piping, wherein the measuring element includes:

a cover including a first material, a measuring channel including a second material that is different than the first material, an electronics module coupled to the cover, the electronics module including a pair of ultrasonic transducers configured to transmit ultrasonic signals through multiple ports into the measuring channel and a processor to calculate a flow value based on the transmitted ultrasonic signals from the pair of ultrasonic transducers, and at least one acoustic reflector plate mounted within a recess of the measuring channel, wherein the acoustic reflector plate includes at least one focusing mirror, formed in a top surface of the at least one acoustic reflector plate, that is configured to reflect the transmitted ultrasonic signals between one or more pairs of ultrasonic transducers, and wherein the measuring element is configured to be installed in a cavity of the main case and operated without field calibration;

inserting into the cavity of the main case the selected measuring element, fastening the selected measuring element to the main case, and introducing, after the fastening, a fluid supply through the measuring channel to operate the water meter assembly without further calibration.

20. The method of claim 19, wherein the at least one focusing mirror and the at least one pair of transducers are configured such that when a beam of ultrasonic signals is transmitted from a first transducer of the pair of transducers, the beam is reflected by the reflector such that a −6 dB beam spread of the reflected beam is at least 90% incident on a face of a second transducer of the pair of transducers.

* * * * *